Figure 1:
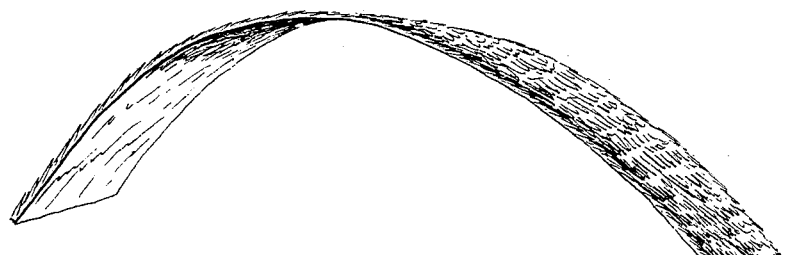

(No Model.)

A. LACHENMEYER.
BREWER'S SHAVINGS.

No. 273,860.  Patented Mar. 13, 1883.

WITNESSES:
J. N. Rosenbaum.
Otto Risch

INVENTOR
August Lachenmeyer
BY Paul Goepel.
ATTORNEY

UNITED STATES PATENT OFFICE.

AUGUST LACHENMEYER, OF NARROWSBURG, NEW YORK.

BREWERS' SHAVINGS.

SPECIFICATION forming part of Letters Patent No. 273,860, dated March 13, 1883.

Application filed November 10, 1882. (No model.)

*To all whom it may concern:*

Be it known that I, AUGUST LACHENMEYER, of Narrowsburg, in the county of Sullivan and State of New York, have invented certain new and useful Improvements in Brewers' Shavings, of which the following is a specification.

Brewers use in their shavings-casks, for the purpose of retaining the yeast-cells and other sediments, shavings of beech, birch, or maple, which shavings have to be boiled repeatedly before use, so as to extract the tannic acid and other parts contained therein. The shavings are used a number of times, but require after each use to be cleaned by boiling, so as to destroy the organic matter deposited thereon. The shavings are either cut by the brewers themselves by means of special shaving-machines constructed for this purpose, or they are furnished to them ready made as an article of manufacture. The shavings made by the brewers are stout and stiff and perfectly smooth on one side, while the opposite side is less smooth, but liable to split. These shavings have the disadvantages that owing to their thickness they have to be boiled for a considerable length of time preparatory to use, and, further, that the yeast cells and finings settle in the interstices of that side which is liable to split or break, so that they can be removed only with difficulty from the shavings by the succeeding washing and boiling process. The sediments remaining in the shavings are liable to develop foul fermentation, which exerts an injurious influence upon the quality of the beer. Another objection to these shavings is that they possess but a small degree of tenacity, so that when they are pulled out by hooks from the casks a loss of about thirty-three per cent. of the shavings takes place by breakage. The shavings which are sold in the market are cut very thin—about eighteen shavings to the inch—and have the disadvantage that both sides are perfectly smooth, so that the yeast particles and finings are not properly retained thereby. Furthermore, these shavings have a tendency to settle or clog at the bottom of the cask, so as not to be capable of holding back the yeast and other sediments against the suction and action exerted thereon by the pumps when the clear liquid above the shavings is drawn off from the shaving-casks to the storage-casks. There is another shaving in the market which is sawed in chips from the block. This has been introduced by me and patented to me heretofore under date of June 24, 1879, No. 216,868. This chip has rough surfaces on both sides, but is thick, stiff, and perfectly straight, and is liable to settle flat at the bottom of the cask without curling, so as not to retain sufficiently the yeast and finings deposited thereon.

The object of this invention is to furnish an improved shaving for brewers' use which to a great extent avoids the disadvantages heretofore mentioned, and which can be easily packed and shipped, is quickly cleared of impurities by boiling, and provided with rough surfaces at both sides, whereby it attracts the yeast and retains the same in a reliable manner, so that the beer above the same can be drawn off in a perfectly clear state.

The invention consists of brewers' shavings made of spirally-coiled shape and provided at both sides with rough surfaces.

Figure 2:
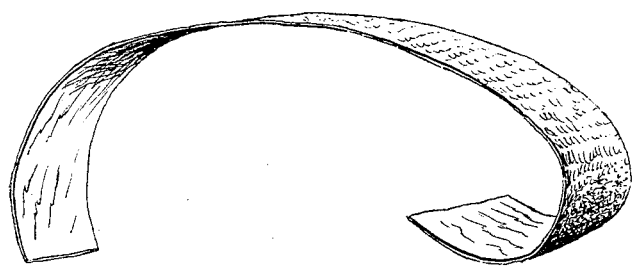
Figure 3:

In the accompanying drawings, Figure 1 represents a perspective view of a common brewers' shaving as made by brewers themselves. Fig. 2 is a perspective view of a thin brewers' shaving as sold in the market. Fig. 3 is a perspective view of a sawed chip or shaving; and Figs. 4 and 5 are perspective views of my improved spirally-coiled shaving, which forms the subject of this invention, shown respectively before and after boiling.

Similar letters of reference indicate corresponding parts.

Figure 4:
Figure 5:

A in Figs. 4 and 5 represents my improved brewers' shaving, which is produced from a suitable block of wood in a spirally-coiled form by supporting the cutter at an angle of inclination to the axis of the block from which the shavings are made, or in any other suitable manner. The cutting-knife is carried with such pressure along the block of wood that a shaving of the proper thickness and length is produced, which curls into spiral shape, but which receives by the pressure of the knife not a smooth but a somewhat roughened and streaky surface at both sides. The spirally-coiled shavings which are thus obtained are made up in large bunches, and are thus shipped to the place of use. When they are boiled preparatory to use in the shavings-cask they lose to some extent their regular spiral form shown in Fig. 4, and assume an irregularly-warped shape, as shown in Fig. 5. The rough and streaky condition of the surface of the shavings is brought out still more by the boiling process, so that the shavings can perform their function of retaining the sediments in a more perfect manner, while by their warped irregular shape they do not clog at the bottom of the cask, they being also more tenacious and durable, so as to cause less loss by breakage.

Having thus described my invention, I claim as new and desire to secure by Letters Patent—

As a new article of manufacture, brewers' shavings consisting of spirally-warped chips of wood having a rough and streaky surface at both sides, substantially as and for the purpose set forth.

In testimony that I claim the foregoing as my invention I have signed my name in presence of two subscribing witnesses.

AUGUST LACHENMEYER.

Witnesses:
PAUL GOEPEL,
SIDNEY MANN.